(12) United States Patent
Hier et al.

(10) Patent No.: US 6,966,829 B1
(45) Date of Patent: Nov. 22, 2005

(54) HVAC SYSTEM FOR A VEHICLE WITH CONCEALED VENTS

(75) Inventors: Michael J. Hier, Milford, MI (US); Glenn A. Cowelchuk, Chesterfield Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/709,771

(22) Filed: May 27, 2004

(51) Int. Cl.[7] .................................................. B60H 1/34
(52) U.S. Cl. ....................... 454/152; 296/70; 454/155
(58) Field of Search ............................... 454/127, 152, 454/153, 154, 155; 296/187.09, 187.12, 208, 296/146.7, 70

(56) References Cited

U.S. PATENT DOCUMENTS

| | | | |
|---|---|---|---|
| 2,987,981 A * | 6/1961 | Boylan ....................... 454/154 |
| 3,602,126 A * | 8/1971 | Breitschwerdt ............. 454/124 |
| 3,724,357 A * | 4/1973 | Kavthekar et al. .......... 454/152 |
| 3,861,281 A * | 1/1975 | Godwin ....................... 454/155 |
| 4,173,174 A * | 11/1979 | Vinko et al. ................. 454/152 |
| 4,782,742 A * | 11/1988 | Yott et al. .................... 454/152 |
| 5,127,238 A * | 7/1992 | Ichikawa et al. ............. 62/244 |
| 5,354,114 A | 10/1994 | Kelman et al. |
| 5,673,964 A | 10/1997 | Roan et al. |
| 5,676,216 A | 10/1997 | Palma et al. |
| 5,752,877 A * | 5/1998 | Sun ............................. 454/155 |
| 5,762,395 A | 6/1998 | Merrifield et al. |
| 6,053,215 A | 4/2000 | Sadr |
| 6,110,037 A | 8/2000 | Yoshinaka |
| 6,273,495 B1 | 8/2001 | Haba et al. |

FOREIGN PATENT DOCUMENTS

DE           2259652 A  *  6/1973  ................. 454/152

* cited by examiner

*Primary Examiner*—Harold Joyce
(74) *Attorney, Agent, or Firm*—Earl LaFontaine

(57) ABSTRACT

An air delivery system (10) for a vehicle (12) includes an air plenum (42) and a coupling joint (14) that is coupled to the air plenum (42). The coupling joint (14) is configured to reside between and is hidden by overlapping sections (34, 36) of a vehicle housing (16). An air transfer device (50) passes air through the air plenum (42) and the coupling joint (14).

20 Claims, 4 Drawing Sheets

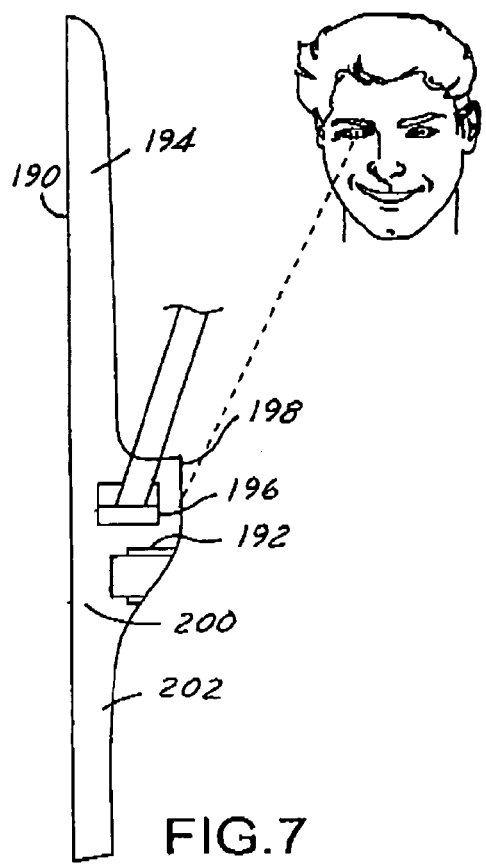
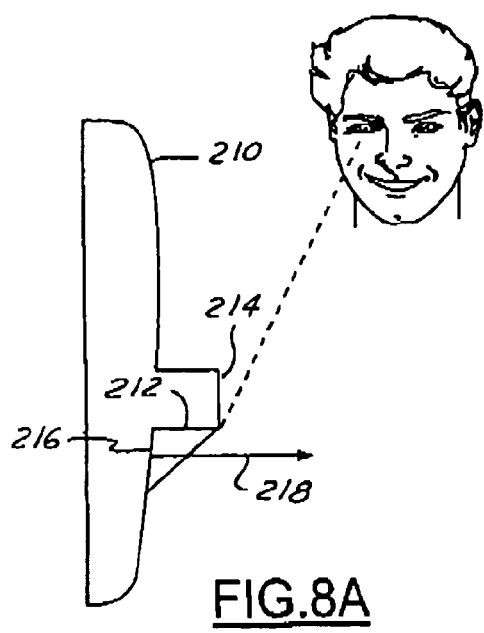
FIG.8A
FIG.7
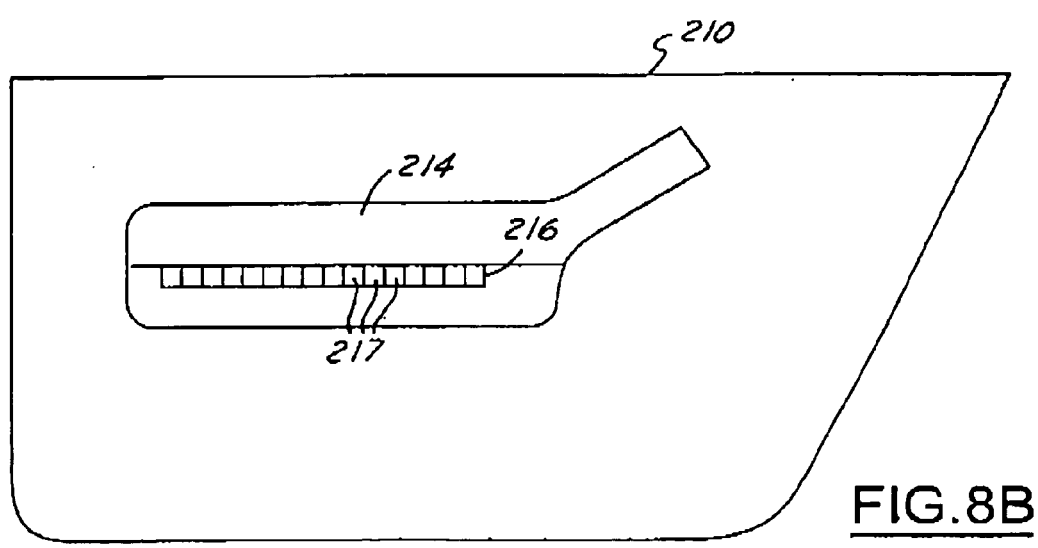
FIG.8B

//<br>

HVAC SYSTEM FOR A VEHICLE WITH CONCEALED VENTS

BACKGROUND OF INVENTION

The present invention relates to vehicle heating, ventilation, and air-conditioning (HVAC) systems and the ductwork contained therein. More particularly, the present invention relates to an HVAC system with output vents that occupy a minimal amount of dashboard space.

Automobiles typically include a dashboard or instrument panel that is mounted within a forward portion of the interior cabin of a vehicle. The dashboard is often configured to engage with an HVAC system. The HVAC system is used for the treating and delivering of air into the passenger compartment for thermal and humidity control therein.

An HVAC system typically includes a centrally located housing having a fan, an air-conditioning evaporator, and a heater core. Several ducts or air channels extend from the housing to grilled vents. Air flows into the HVAC system, is conditioned, passes through the vents, and enters the passenger compartment.

It is desirable to quickly obtain a set temperature within an interior cabin of a vehicle. It is also desirable to provide multiple climate-controlled zones that are uniformly heated or cooled. Climate-controlled zones refer to areas within a vehicle that are set at different temperatures. With the ever increasing desire for improved temperature ramp up times, for uniform air conditioned climates, and for an increased number of different climate-controlled zones, comes an increased number of vents and corresponding ducts. The vents and ducts occupy space both interior to and on the surface of the dashboard. It is not uncommon for a single dashboard to have 5–10 different vents with corresponding ducts.

Since such a large amount of cross-sectional surface area and internal space of a dashboard is occupied by the vents and ducts of an HVAC system, there is less space for other vehicle systems, such as electronic systems, control systems, and audio and video systems. There also exists less storage space, such as glove box space. The large space usage by the vents and ducts also hinders the design and layout of a dashboard and of the interior cabin of a vehicle.

Thus, there exists a need for an improved HVAC system that satisfies current HVAC system requirements and desires and utilizes a minimal amount of dashboard surface area and internal space.

SUMMARY OF INVENTION

The present invention provides an air delivery system for a vehicle that includes an air plenum and a coupling joint that is coupled to the air plenum. The coupling joint is configured to reside between and is hidden by overlapping sections of a vehicle housing. An air transfer device passes air through the air plenum and the coupling joint.

The embodiments of the present invention provide several advantages. One such advantage is the provision of an HVAC system that includes an air outlet for an interior cabin of a vehicle that is hidden with respect to the line-of-sight of a vehicle occupant residing within a vehicle seat.

Another advantage provided by an embodiment of the present invention is that it provides the provision of an HVAC system with vents and corresponding ducts that occupy a reduced amount of cross-sectional surface area and internal space of a dashboard.

Furthermore, the present invention is versatile in that it may be applied to various lock assemblies and ignition systems. Moreover It is yet another advantage of an embodiment of the present invention to provide an HVAC system with a reduced number of system components and thus reduced system complexity.

The above-stated advantages of the present invention provide increased dashboard and interior cabin design flexibility.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein:

FIG. 7 is a side cross-sectional view of a b-pillar assembly incorporating a hidden overlapping coupling joint in accordance with another embodiment of the present invention;

FIG. 8A is a rear cross-sectional view of a door panel assembly incorporating a hidden overlapping coupling joint in accordance with another embodiment of the present invention; and FIG. 8B is a side cross-sectional view of the door panel assembly of FIG. 8A.

DETAILED DESCRIPTION

Figure 1:
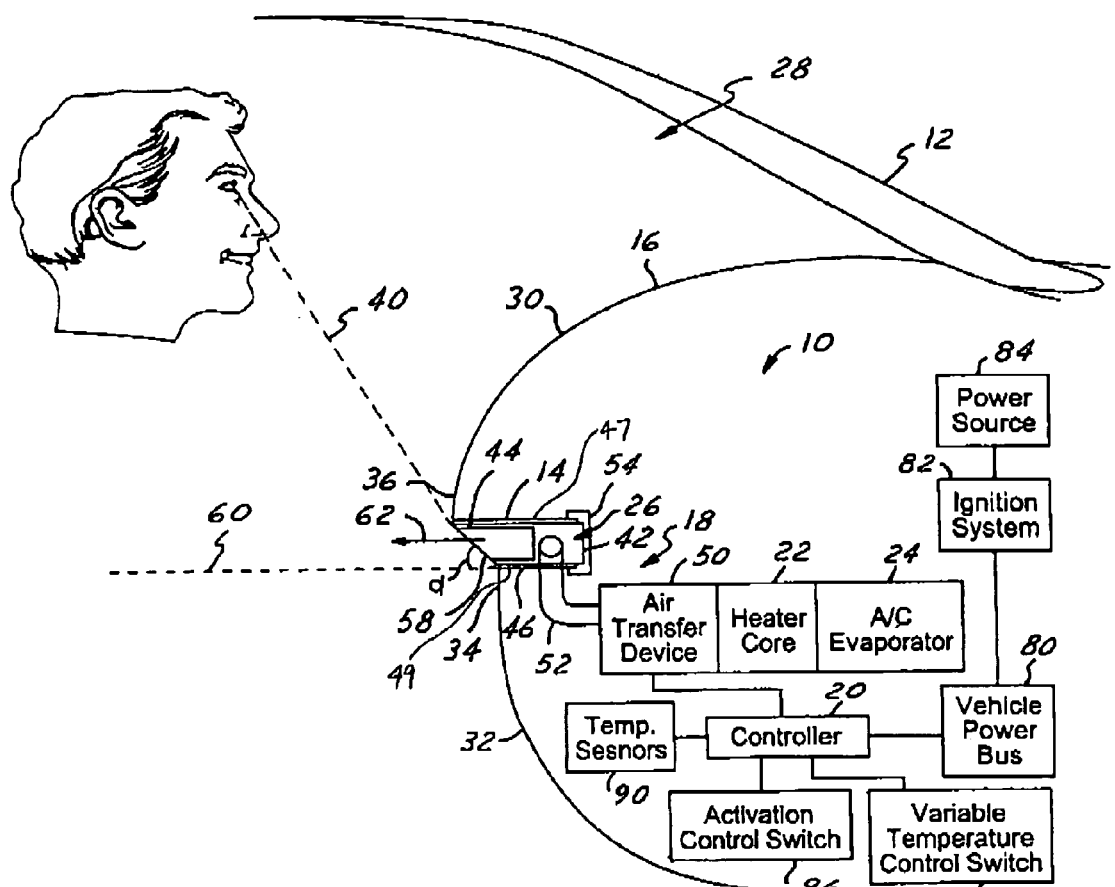
FIG. 1 is a side cross-sectional and block diagrammatic view of an air control system for a vehicle incorporating a hidden overlapping dashboard coupling joint in accordance with an embodiment of the present invention.

In the following figures the same reference numerals will be used to refer to the same components. While the present invention is described primarily with respect to an HVAC system for a vehicle, the present invention may be adapted and applied in various locations within a vehicle or may be applied in other non-vehicle applications. The present invention may be applied in various locations within a vehicle, such as in a dashboard, in an overhead console, in a center console, in a pillar, in a door panel, or in other console or module locations where air vents or outlets may be utilized.

In the following description, various operating parameters and components are described for one constructed embodiment. These specific parameters and components are included as examples and are not meant to be limiting.

Also, in the following description the term "hidden" refers to the inability of a vehicle occupant to visually see a particular component while in a normal seated position. For example, a panel air outlet, plenum, or vent may be hidden with respect to the line-of-sight of a vehicle occupant while seated in a vehicle seat in a normal upright seated position, but may be seen when viewed from a low viewing angle, such as when lying down or leaning laterally to view a lower or under body portion of a dashboard. A vehicle component may be hidden for occupants that are within a specified height range or that are taller than a specified height threshold and may not be hidden for occupants that are shorter. For example, a height range may be set at 5–6 ft and a component may be hidden for occupants that are of a height within that height range. As another example, a height threshold may be set at 5 ft and a component may be hidden for occupants that are shorter than 5 ft. Of course, the height range and the height threshold may be set and any desired values.

A vehicle component, such as an air plenum or an air vent, may be "horizontally hidden" or hidden from various different angles. Horizontally hidden refers to the horizontal overlapping of component sections such that a component coupling joint, an outlet, an air vent, or an air plenum is not normally visible by a vehicle occupant, which is described in further detail below.

Figure 2:
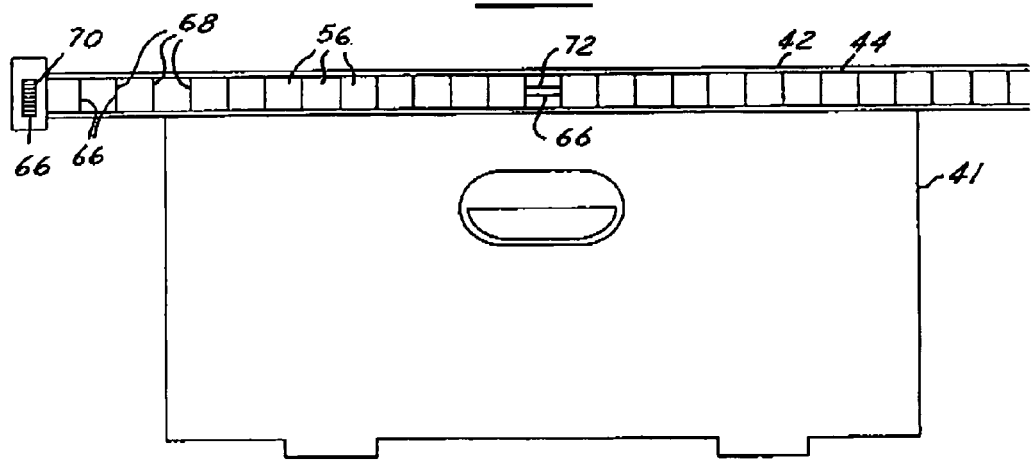
FIG. 2 is a front view of a dashboard assembly incorporating a hidden overlapping dashboard coupling joint in accordance with an embodiment of the present invention.

Referring now to FIGS. 1 and 2, a side cross-sectional and block diagrammatic view of an air control system 10 for a vehicle 12 incorporating an overlapping dashboard coupling joint 14 and a front view of a dashboard assembly 16 having the same in accordance with an embodiment of the present invention is shown. The air control system 10 is shown in the form of an HVAC system and includes the dashboard assembly 16, an air delivery system 18, and a controller 20. The air control system 10 may be in the form of a heating system, a ventilation system, or an air-conditioning system. Air is circulated through a heater core 22 and/or an air-conditioning evaporator 24 via the air delivery system 18 through a hidden opening or gap 26 in the dashboard 16 and into an interior cabin 28 of the vehicle 12. Although the air control system 10 is described primarily with respect to a dashboard application, the air control system 10 may be applied to other vehicle interior assembly applications, some of which are mentioned above.

The dashboard 16 includes a first or upper housing section 30 and a second or lower housing section 32. An upper portion 34 of the lower section 32 is recessed relative to a lower portion 36 of the upper section 30 such that the upper section 30 horizontally overlaps the lower section 32. The upper section 30 and the lower section 32 may be in various sizes, shapes, and styles. The upper section 30, the lower section 32, and the coupling joint 14 may be integrally formed as a single module or may be separate components as shown. The upper section 30, the lower section 32, and the coupling joint 14 may be injection molded, formed using stereolithography, or formed using some other technique known in the art.

One or more coupling joints, such as coupling joint 14, resides within the gap 26 between the upper section 30 and the lower section 32. The coupling joint 14 is hidden with respect to the line-of-sight of a vehicle occupant residing within a vehicle seat. An example line-of-sight is designated by line 40. The gap 26 may be at various locations on the dashboard 16, such as above a glove box 41.

The coupling joint 14 couples the upper section 30 and the lower section 32 to one or more nozzles or air plenums 42 (only one is shown), which may have or be coupled to vents 44 (only one is shown). The coupling joint 14 may include a pair of horizontal segments 46 as shown or may include various other segments arranged in various other configurations, another example of which is provided with respect to FIG. 4. The coupling joint 14 may have a first or top horizontal segment 47 that is directly adjacent the upper section 30 and a second or bottom horizontal segment 49 that is directly adjacent the lower section 32.

The air delivery system 18 includes an air transfer device 50 that delivers or passes air through the coupling joint 14, the air plenum 42, the vent 44, and the ductwork 52. Although a specific number of coupling joints, air plenums, and vents are shown, any number of each may be utilized. The air plenum 42 is coupled to and may clip into and extend along the horizontal members 46. The vent 44 resides within, is coupled to, and may extend along the coupling joint 14 and the air plenum 42.

The air plenum 42 and the vent 44 may also be attached to the coupling joint 14 via coupling members, such as a clip, a tab, a socket, a fitting, a fastener, or some other type of coupling member known in the art. A sample coupling member 54 is shown and is in the form of a bracket.

The air plenum 42 and the vent 44 may be of various sizes, shapes, types, and styles known in the art. The air plenum 42 has outlets 56 with an outer edge 58. The outer edge 58 may be angled downward at an approximate 45° angle relative to a horizontal plane 60 as shown or may be at various other angles. The angle α (of the outer edge 58 relative to the horizontal plane 60 is such that the air plenum 42 is hidden from the line-of-sight 40. Although the outer edge 58 is angled in a downward direction, the air plenum 42 may direct air inward and directly at vehicle occupants or seats, as is designated by arrow 62. Although the air plenum 42 is hidden from the line-of-sight 40, the air plenum 42 may be seen when viewed directly and at a horizontal level approximately in line with or below that of the air plenum 42, as is shown in FIG. 2.

Figure 3:
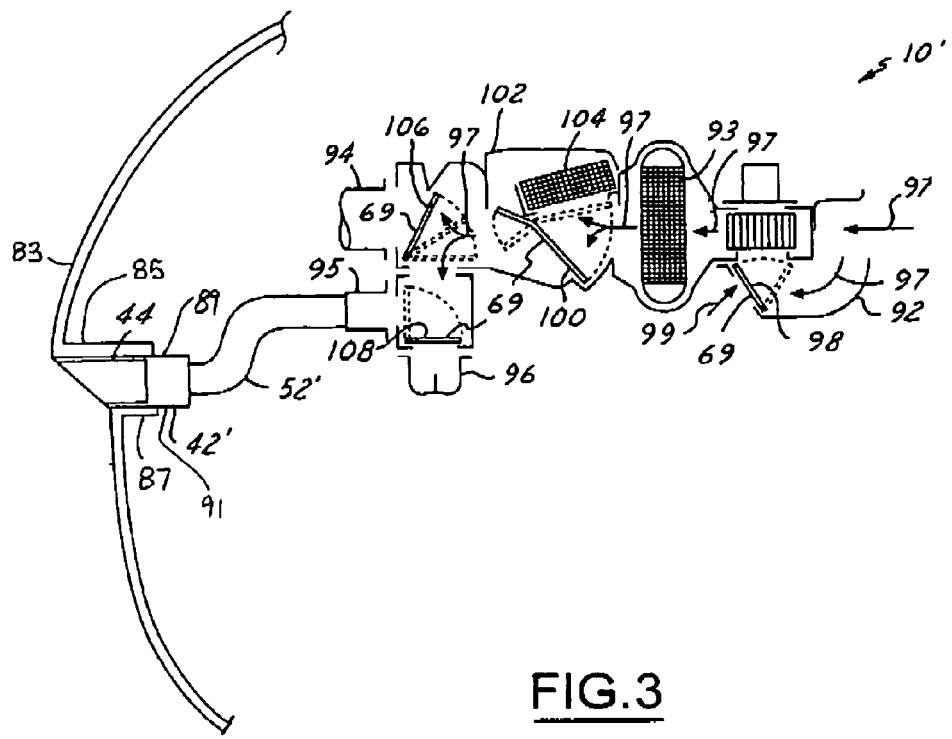
FIG. 3 is a schematic flow diagram illustrating air flow through an air control system in accordance with an embodiment of the present invention.

The vent 44 may include air flow adjustment devices 66 that adjust the direction and the amount of air flow in one or more directions. The air flow adjustment devices 66 may be used to adjust the flow of air in the fore, aft, and lateral directions. The air flow adjustment devices 66 may be used to vary the flow volume of air into the interior cabin 28 and may be used to stop or prevent the flow of air. The air flow adjustment devices 66 may include fins or vanes 68 that pivot on hinged mechanisms (not shown), flaps or butterfly valves 69 (which are best seen in FIG. 3), a thumbwheel shut off dial 70, a lateral adjustment lever 72, or other air flow adjustment devices known in the art. The thumbwheel dial 70 may actuate valve 108 in FIG. 3. Although the air control system 10 includes vent 44, which is in the form of a panel vent, it may include various other vents, such as defroster vents and floor vents.

The ductwork 52 may be replaced with air lines or hoses. The hoses may be high-pressured lines such that they occupy a smaller amount of space forward of the dashboard than is occupied by the ductwork 52.

The air transfer device 50 may include a blower motor, a fan, a pump, and other air transfer components known in the art. The air transfer device 50 may be coupled upstream or downstream from and pull, draw, circulate, pump, pass, force, or direct air through the heater core 22 and the air-conditioning evaporator 24.

The controller 20 is coupled to the air transfer device 50. The controller 20 controls temperature, pressure, volume, and type of air flowing through the air delivery system 18 and into the interior cabin 28. The controller 20 may monitor and adjust the air temperature and provide a thermally controlled environment within the interior cabin 28.

The controller 20 may be microprocessor based such as a computer having a central processing unit, memory (RAM and/or ROM), and associated input and output buses. The controller 20 may be in the form of application-specific integrated circuits or may include other logic devices known in the art. The controller 20 may be a portion of a central vehicle main control unit, an interactive vehicle dynamics module, or may be a stand-alone controller as shown.

The controller 20 is coupled to a vehicle power bus 80 from which it receives power. The vehicle power bus 80 may be coupled to an ignition system 82 and receive power from a power source 84. The controller 20 may be enabled upon activation of the ignition system 82. The controller 20 may be coupled to various control switches, such as an activation control switch 86 and a variable temperature control switch 88, as shown. The activation control switch 86 is used to activate or enable the air control system 10 and provide a thermally controlled environment within the interior cabin 28. The temperature control switch 88 is used to adjust the temperature in one or more zones within the interior cabin 28. The controller 20 adjusts the temperature within the interior cabin 28, depending upon the setting of the temperature switch 88.

The controller 20 may also be coupled to one or more temperature sensors 90. The temperature sensors 90 generate temperature signals indicative of the temperature within the interior cabin 28. The controller 20 compares the value of the temperature signal with a desired temperature setting on the temperature switch 88 and adjusts temperature within the interior cabin 28, accordingly.

Referring now to FIG. 3, a schematic flow diagram illustrating air flow through an air control system 10' in accordance with an embodiment of the present invention is shown. The air control system 10' includes a dashboard housing 83 with an air plenum 42'. The housing 83 includes a first wall 85 and a second wall 87. The first wall 85 is adjacent and attached to a top side 89 of the air plenum 42'. The second wall 87 is adjacent and attached to a bottom side 91 of the air plenum 42'. Air enters the ductwork 92, passes through an evaporator core 93, and may be directed to defroster vents (not shown), to panel vents (such as vent 44), and to floor vents (not shown) via a first passage 94, a second passage 95, and a third passage 96, respectively.

The valves 69 are used to direct the flow of the air, represented by arrows 97. A first valve 98 is used to select between air exterior or interior to the interior cabin 24. Air from the interior cabin 28 may be referred to as recirculating air, represented by arrow 99. A second valve 100 and a third valve 102 are used to direct the air 97 through a heater core 104. A forth valve 106 is used to direct air 97 through the first passage 94. A fifth valve 108 is used to direct the air 97 through the second passage 95 and the third passage 96. When the air 97 is passed through the passage 95 it is directed through the ductwork 52' and through the air supply plenum 42'. Various vacuum and non-vacuum techniques known in the art may be utilized in operation of the valves 69.

Figure 4:
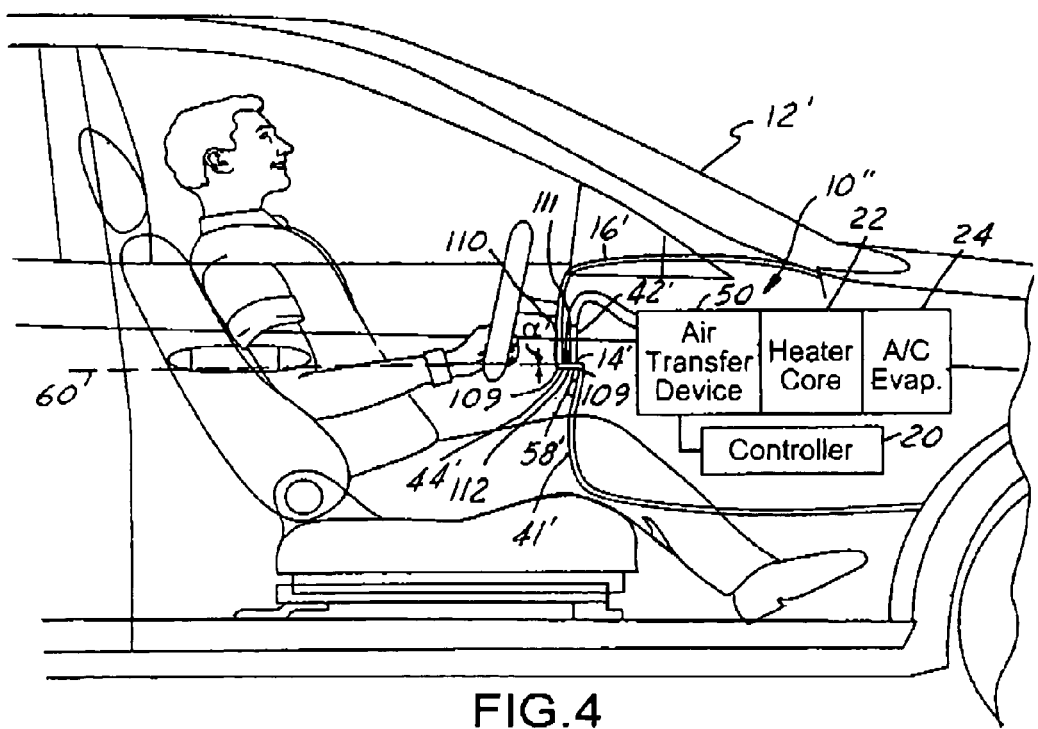
FIG. 4 is a side cross-sectional and block diagrammatic view of an air control system for a vehicle incorporating a hidden overlapping dashboard coupling joint in accordance with another embodiment of the present invention.

Referring now to FIG. 4, a side cross-sectional and block diagrammatic view of an air control system 10" for a vehicle 12' incorporating a hidden overlapping dashboard coupling joint 14' in accordance with another embodiment of the present invention is shown. The coupling joint 14' is similar to the coupling joint 14 except that the angle α' of the outer edge 58' is approximately at a 0° angle relative to and is thus parallel to the horizontal plane 60. The coupling joint 14' may have notches (not shown) where the air plenum 42' and the vent 44' clip therein.

The coupling joint 14' includes a pair of vertical sections 109 and a horizontal section 110 that are coupled to the vertical sections 109. The vertical sections 109 may be substantially vertical and the horizontal section 110 may be substantially horizontal as shown or may be at other known angles. The horizontal section 110 has an interior side 111 and an exterior side 112. Although the coupling joint 14' is shown as being "n"-shaped, it may be in various other shapes known in the art while maintaining the hidden configuration thereof. The coupling joint 14' may reside above a glove box 41' as shown or may be in various other locations on the dashboard 16'.

Figures 5A, 5B, 5C, 5D, 5E:
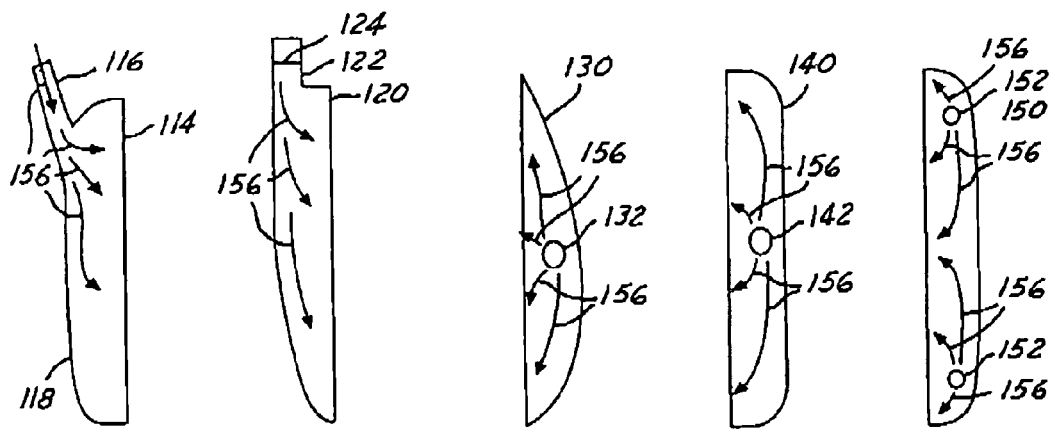
FIG. 5A is a top view of an air supply plenum in accordance with an embodiment of the present invention.
FIG. 5B is a top view of an air supply plenum in accordance with another embodiment of the present invention.
FIG. 5C is a top view of an air supply plenum in accordance with yet another embodiment of the present invention.
FIG. 5D is a top view of an air supply plenum in accordance with still another embodiment of the present invention.
FIG. 5E is a top view of an air supply plenum in accordance with another embodiment of the present invention.

Referring now to FIGS. 5A–E, top views of sample air supply plenums are shown in accordance with multiple embodiments of the present invention. In FIG. 5A, a first air supply plenum 114 is shown having an air supply tube 116 coupled to and angled off the back side 118 of the supply plenum 114. The air supply tube 116 may be coupled at various different angles to the first plenum 114. In FIG. 5B, a second air supply plenum 120 is shown having a side feed connection 122. The second plenum 120 may be a left-hand feed or a right-hand feed plenum. A butterfly valve 124 may be incorporated into the side feed connection 122.

In FIG. 5C, a third air supply plenum 130 is shown having a semi-circular shape and a center air supply feed connection 132. In FIG. 5D, a forth air supply plenum 140 is shown being somewhat rectangular in shape and also having a center air supply feed connection 142. In FIG. 5E, a fifth air supply plenum 150 is shown having a pair of side air supply feed connections 152. The air flow through the above-mentioned plenums is represented by arrows 156. Also, the above-mentioned plenums may have any number of feed connections.

Figure 6:
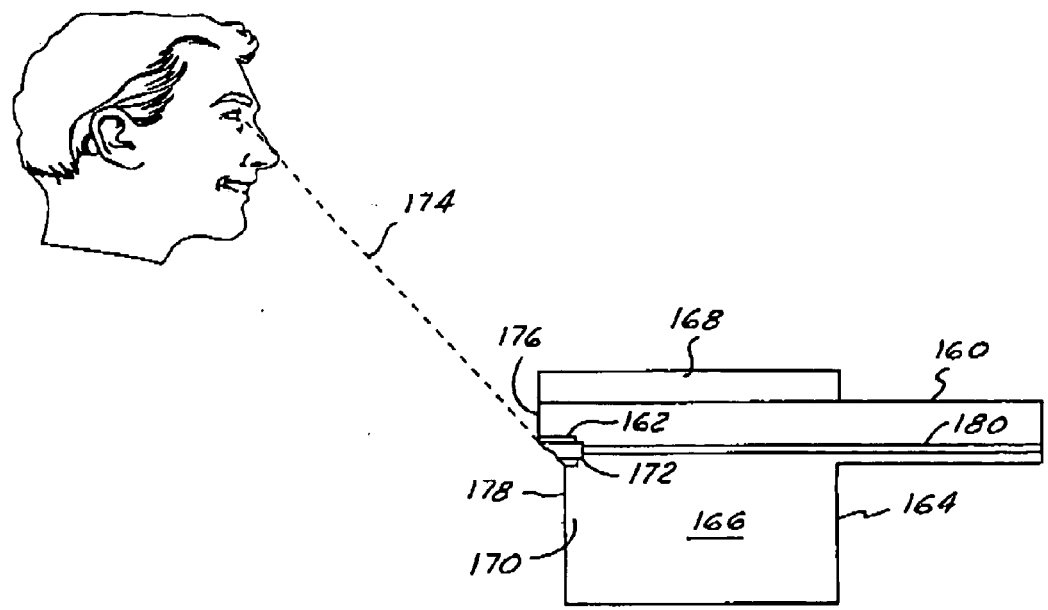
FIG. 6 is a side cross-sectional view of a center console assembly incorporating a hidden overlapping coupling joint in accordance with another embodiment of the present invention.

Referring now to FIG. 6, a side cross-sectional view of a center console assembly 160 incorporating a hidden overlapping coupling joint 162 in accordance with another embodiment of the present invention is shown. The center console 160 includes a housing 164 having a storage area 166 with a lid 168. The coupling joint 162 resides in a rear portion 170 of the console 160 and is oriented such that an air supply plenum 172 is directed at passengers rearward of the console 160. The coupling joint 162 is similarly hidden from the passengers line-of-sight 174 due to the horizontal overlapping of the upper section 176 with the lower section 178 of the console 160. The coupling joint 162 receives air via the air supply line 180.

Referring now to FIG. 7, a side cross-sectional view of a b-pillar assembly 190 incorporating a hidden overlapping coupling joint 192 in accordance with another embodiment of the present invention is shown. The b-pillar assembly 190 includes a pillar housing 194 with a seat belt retractor 196 mounted within an inward protruding center section 198 thereof. The coupling joint 192 is located in a lower portion 200 of the center section 198 below the retractor 196. The coupling joint 192 is hidden due to the horizontal overlapping of the center section 198 with the lower section 202. Although the coupling joint 192 is shown as being configured and utilized within a b-pillar, the joint may be easily modified to be utilized within other vehicle pillars.

Referring now to FIGS. 8A–B, a rear cross-sectional view and a side cross-sectional view of a door panel assembly 210 are shown incorporating a hidden overlapping coupling joint 212 in accordance with another embodiment of the present invention. The door panel assembly 210 includes an armrest 214. The coupling joint 212 is located underneath the armrest 214. An air supply plenum 216 with air outlets 217 is coupled within the coupling joint 212 and directs air inward, as designated by arrow 218.

The present invention provides a simple, inexpensive, and efficient technique of providing air vents within a dashboard assembly while minimizing the amount of cross-sectional surface area occupied by the vents. The minimal use of cross-sectional surface area provides area for other vehicle systems, devices, and storage modules. The present invention also minimizes the amount of space utilized or occupied by an air control system within a dashboard housing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An air delivery system for a vehicle comprising:
   at least one air plenum;
   at least one coupling joint coupled to said at least one air plenum;
   at least one vent coupled to said at least one coupling joint; and
   at least one air transfer device passing air through said at least one air plenum, said at least one coupling joint, and said at least one vent;
   wherein said at least one vent resides between and is hidden, with respect to a line-of-sight of a vehicle occupant in a normal seated position, by overlapping sections of a vehicle housing when in a normal operating state.

2. A system as in claim 1 wherein said overlapping sections comprise:
   a first section; and
   a second section that overlaps said first portion.

3. A system as in claim 1 wherein said at least one vent extends along and resides within said at least one coupling joint.

4. A system as in claim 2 wherein said second section overlaps said first section such that an air outlet of said at least one air plenum is hidden with respect to a normally seated occupant line-of-sight.

5. A system as in claim 2 wherein an upper portion of said first section is recessed relative to a lower portion of said second section.

6. A system as in claim 2 wherein said first section and said second section are integrally formed as a single module.

7. A system as in claim 1 wherein said vehicle housing is selected from at least one of a dashboard housing, a center console housing, a pillar housing, and a door panel housing.

8. A system as in claim 1 further comprising at least one air flow adjustment device adjusting at least one of the direction of air flow out from said at least one air plenum and the amount of air flow through said at least one plenum.

9. A system as in claim 1 further comprising a controller coupled to said air transfer device and controlling at least one parameter selected from temperature, pressure, volume, and type, of air flowing through said at least one air plenum.

10. A system as in claim 1 wherein said at least one air plenum comprises an output with an outer edge that is at an angle of approximately between 30°–60° relative to a horizontal plane of the vehicle, said air plenum directing air toward a seat system of the vehicle.

11. A system as in claim 1 wherein said at least one air plenum extends along said at least one coupling joint.

12. A system as in claim 1 further comprising at least one coupling member attaching said at least one air plenum to said at least one coupling joint.

13. A system as in claim 12 wherein said at least one coupling member is selected from at least one of a clip, a tab, a bracket, a socket, a press-fit fitting, a tree fastener, and a fastener.

14. A dashboard assembly for a vehicle comprising:
    a lower housing;
    an upper housing overlapping said lower housing;
    at least one air plenum residing between said lower housing and said upper housing
    at least one coupling joint coupled to said at least one air plenum; and
    at least one air transfer device passing air through said at least one air plenum, said at least one coupling joint, and into an interior cabin of the vehicle;
    wherein said upper housing overlaps said lower housing to hide an air outlet of said at least one air plenum and said at least one coupling joint, with respect to a normally seated occupant line-of-sight, when in a normal operating state.

15. A dashboard assembly as in claim 14 further comprising at least one vent coupled to said at least one coupling joint.

16. A dashboard assembly as in claim 15 wherein said upper housing overlaps said lower housing such that said at least one vent is hidden with respect to a normally seated occupant line-of-sight.

17. A vehicle interior assembly comprising; at least one air plenum having an air outlet from which air enters an interior vehicle cabin;
    a dashboard having an upper housing that overlaps a lower housing to hide said air outlet during a normal operating state;
    at least one coupling joint coupled to said at least one air plenum and residing between said upper housing and said lower housing; and
    at least one air transfer device passing air through said at least one air plenum, said at least one coupling joint, and into said interior vehicle cabin.

18. An interior assembly as in claim 17 further comprising at least one vent coupled to said at least one coupling joint.

19. A system as in claim 2 wherein said first section is adjacent a first segment of said coupling joint and said second section is adjacent a second segment of said coupling joint.

20. A system as in claim 1 wherein a first wall of said housing is adjacent a top side of said air plenum and a second wall of said housing is adjacent a bottom side of said air plenum, and wherein said first wall overlaps said second wall.

* * * * *